March 26, 1968 — J. H. BERNARD — 3,374,833
HEATING STILL
Filed May 4, 1966

INVENTOR:
Jacques Henri Bernard
Attorney

United States Patent Office 3,374,833
Patented Mar. 26, 1968

3,374,833
HEATING STILL
Jacques Henri Bernard, Livry-Gargan, France, assignor to Societe pour l'Equipement de la Blanchisserie et de la Teinturerie Francaises, Paris, Seine, France, a French body corporate
Filed May 4, 1966, Ser. No. 547,660
Claims priority, application France, May 12, 1965, 16,675
1 Claim. (Cl. 165—140)

ABSTRACT OF THE DISCLOSURE

A still comprising a tank for a liquid to be vaporized, a heating chamber which surrounds said tank and is in communication with a source of heating fluid, a heat exchange chamber disposed around said heating chamber, two expansion chambers adjacent said heat exchange chamber and in fluid communication therewith, a fluid to be heated being introduced into the heat exchange chamber through one of the expansion chambers and leaving the heat exchange chamber through the other expansion chamber.

---

Figure 1:
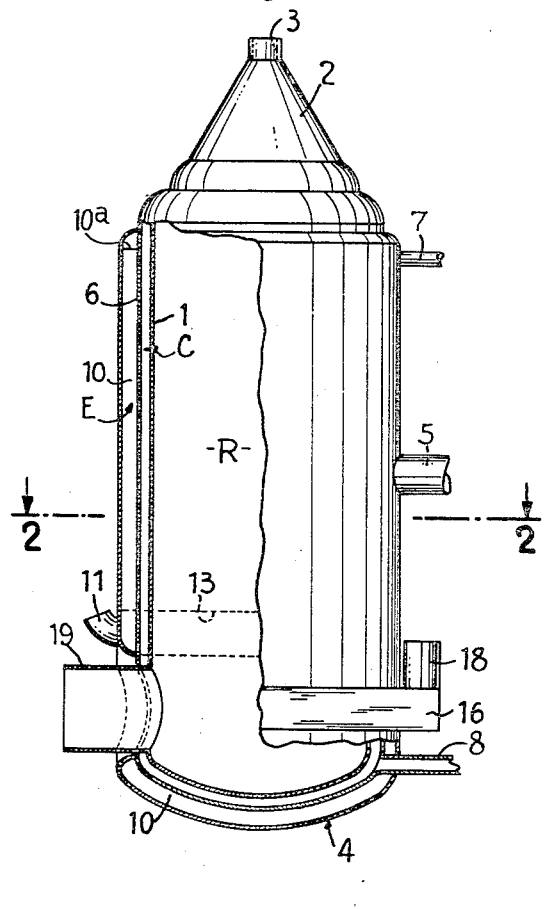

The present invention relates to an improved still.

In a certain number of industrial installations, it is necessary to effect simultaneously the distillation or vaporization of liquids and the heating of fluids for their utilization in any part of the installation.

This arises in particular in installations for dry-cleaning clothes where it is necessary both to purify the solvents that have been used in the cleaning so as to separate them from the impurities they contain and to heat air so as to send it to the cleaning drum for drying the clothes and discharging the solvent. These operations are usually carried out in two separate apparatuses, namely a still for the distillation of the solvent and an air heater. Each of these two apparatuses consume heat independently to obtain the desired result.

These known installations are both large in size and consume a large amount of heat.

The object of the invention is to remedy the aforementioned drawbacks and to provide an improved still which could also be used as a fluid heater.

The still according to the invention comprises a tank for the liquid to be vaporized, heating means for heating said liquid, and a heat exchange chamber disposed around said tank for receiving a fluid to be heated.

According to another feature of the invention, the means for heating the liquid to be vaporized comprise a heating chamber which surrounds said tank and in which a heating fluid circulates and said heat exchange chamber is disposed around the heating chamber.

Further features and advantages of the invention will be apparent from the ensuing description with reference to the accompanying drawing to which the invention is in no way limited.

Figure 2:
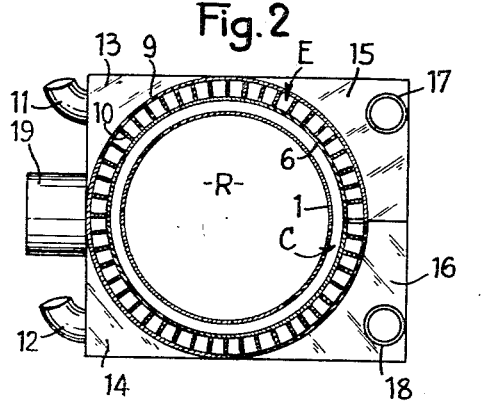

In the drawing:

FIG. 1 is an elevational view, partly in longitudinal section, of a still according to the invention, and FIG. 2 is a cross-sectional view taken along line 2—2 of FIG. 1.

With reference to the drawing, it can be seen that the still comprises a tank R which has a cylindrical wall 1 provided at its upper part with a cone 2 which facilitates the discharge through an aperture 3 of the vapors of the liquid to be vaporized (for example a solvent).

The tank is closed at its lower part by a curved base 4. A pipe 5 supplies the solvent to be evaporated to the base of the tank.

Formed around the cylindrical body 1 and the base 4 of the tank is a heating chamber C which is defined internally by the wall of the tank and externally by a wall 6. A heating fluid, such as steam, circulates in said chamber C, it entering by way of a pipe 7 at the upper end of the apparatus and issuing by way of a pipe 8 at the base of the latter.

The heating chamber C is surrounded by a heat exchanger chamber E defined internally by the wall 6 and externally by a wall 9.

Fins 10 are disposed inside the chamber E and extend radially from the wall 6 of the heating chamber towards the wall 9, said fins being secured to said wall, for example by welding. The fins form in the chamber E circulation passageways for the fluid to be heated, for example air. The fins are advantageous in that they permit a rapid rise in temperature of the fluid and a perfectly fluid flow, there being no pressure drop owing to their special shape.

Means (not shown) such as openings in the fins or an interruption thereof as shown at 10a (FIG. 1) are provided at the upper part of the chamber E to permit communication between the fluid inlet side and outlet side of this chamber.

The fluid to be heated enters the chamber E by way of two flexible inlet pipes 11 and 12 which communicate with two expansion chambers 13 and 14 respectively located in side-by-side relation near the base of the tank R and adjacent one half of the periphery of the heating chamber C (FIG. 2). The chambers 13 and 14 communicate with said circulation passageways located on the corresponding half of the chamber E. The hot fluid issues from the heat exchanger E by way of two outlet pipes 17 and 18 after having passed through two expansion chambers 15 and 16 which are respectively located in side-by-side relation adjacent the other half of the periphery of the heating chamber and advantageously at a lower level than the expansion chambers 13 and 14. The chambers 15 and 16 communicate with said circulation passageways located on the corresponding half of the chamber E. A pipe 19 at the base of the apparatus permits discharging sludge from the tank R.

The apparatus operates in the following manner:

With the solvent to be evaporated in the tank R and the heating fluid (steam for example) circulating in the heating chamber C, the fluid to be heated (for example air) is supplied to the chamber E. This air flows through the expansion chambers 13 and 14, through said passageways between the fins 10, arrives at the upper part of the chamber E redescends and leaves the latter by way of the expansion chambers 15 and 16 and the pipes 17 and 18. In thus flowing, the air is heated by a heat exchange effect by the heating fluid in the chamber C.

As concerns the vapors of the solvent, they leave the still at 3 and are piped to an appropriate apparatus, for example a condenser such as that described in the French Patent application No. 16,676, filed on May 12, 1965, by the applicant.

The heating still according to the invention permits in particular a rapid and continuous distillation of the solvent without particular handling, a great economy in heat since the heating fluid serves both to distil the solvent and to heat the fluid circulating in the chamber E by a heat exchange effect through the wall of the heater. All the heat available is utilized and as the chamber E replaces the usual heat insulating means, the heating of the fluid requires practically no heat other than that normally necessary for distilling the solvent.

Its overall size is very small and it permits a saving in the cost of installation of an independent fluid heater.

As mentioned hereinbefore, the heating still according to the invention, although of utility for all kinds of industrial purposes is of particular utility in dry-cleaning installations where, for example when it is associated with a condenser of the type described in said French patent application, it affords an important saving in heat and time while at the same time it simplifies the work of the operator.

Although specific embodiments of the invention have been described, many modifications and changes may be made therein without departing from the scope of the invention as defined in the appended claim.

Having now described my invention what I claim as new and desire to secure by Letters Patent is:

1. A still comprising a tank having a substantially vertical axis, liquid inlet and outlet pipe means for connecting said tank to a source of liquid to be vaporized, a heating chamber surrounding said tank, a heat exchange chamber surrounding said heating chamber, said heating chamber and heat exchange chamber having a common wall, elongate fins secured to said common wall and extending laterally from said common wall radially of said axis across the entire width of said heat exchange chamber and extending longitudinally in a direction substantially parallel to said axis, said fins constituting circulation passageways for the circulation of said fluid to be heated, an opening adjacent the upper end of each fin for putting said circulation passageways in communication with each other, first expansion chamber means located near the lower end of said heat exchange chamber, second expansion chamber means located near the lower end of said heat exchange chamber, said first expansion chamber means communicating directly with the lower part of said circulation passageways in one half of the periphery of said heat exchange chamber, said second expansion chamber means communicating directly with the lower part of said circulation passageways in the rest of said periphery of said heat exchange chamber, fluid inlet means communicating with said first expansion chamber means and fluid outlet means communicating with said second expansion chamber means.

References Cited

UNITED STATES PATENTS

| 2,035,341 | 3/1936 | Radloff. | |
| 2,091,119 | 8/1937 | Saint-Jacques | 165—140 |
| 2,316,273 | 4/1943 | Meyer et al. | 165—141 |
| 2,870,997 | 1/1959 | Soderstrom | 165—155 |
| 3,280,899 | 10/1966 | Brasie | 165—140 |

FOREIGN PATENTS

| 486,237 | 6/1938 | Great Britain. |

ROBERT A. O'LEARY, *Primary Examiner.*

M. A. ANTONAKAS, *Assistant Examiner.*